(No Model.)

J. T. SMITH.
FOOT WARMER.

No. 284,914. Patented Sept. 11, 1883.

Witnesses.
R. B. Turpin,
R. W. Bishop

Inventor
John T. Smith
By R. S. & A. P. Lacey
Attys

UNITED STATES PATENT OFFICE.

JOHN T. SMITH, OF UHRICHSVILLE, OHIO, ASSIGNOR OF ONE-HALF TO JOHN B. DAWSON, OF SAME PLACE.

FOOT-WARMER.

SPECIFICATION forming part of Letters Patent No. 284,914, dated September 11, 1883.

Application filed January 12, 1883. (No model.)

*To all whom it may concern:*

Be it known that I, JOHN T. SMITH, a citizen of the United States, residing at Uhrichsville, in the county of Tuscarawas and State of Ohio, have invented certain new and useful Improvements in Foot-Warmers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in foot-warmers; and it consists in the construction, combination, and arrangement of the several parts, as will be hereinafter fully described, and specifically pointed out in the claim.

Figure 1:
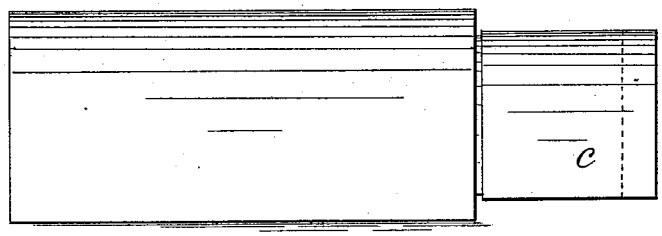
Figure 2:
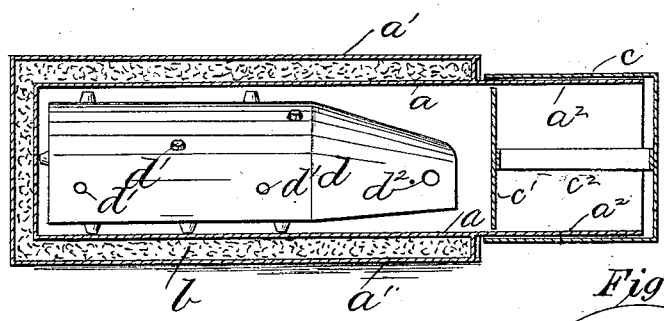
Figure 4:
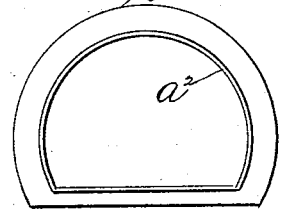
Figure 3:
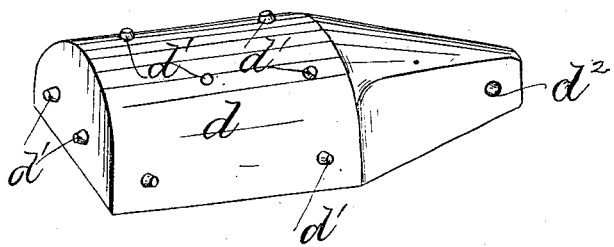
Figure 5:
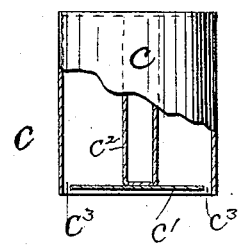

In the drawings, Figure 1 is a side view, Fig. 2 is a vertical longitudinal section, and Fig. 4 is an end view, of a warmer constructed according to my invention; and Figs. 3 and 5 are detail views, as will be described.

The radiator is made approximately semi-cylindrical, as shown, and is composed of the inner and outer cases, $a$ $a'$, the space between which is packed with fire-clay, $b$, or other suitable substance. The end of casing $a$ is projected out of the casing $a'$ for a considerable distance, as shown in Figs. 1 and 2, so as to provide an extension, $a^2$, to serve as a handle whereby the warmer may be grasped and moved from place to place.

$c$ is the lid or cap, having its sides made about as long as the extension $a^2$, and provided with the plate $c'$, arranged in its open end, and held by the stem $c^2$, as shown in Figs. 2 and 5. This plate $c'$ is made almost as large as the inner bore of the casing, leaving only a space, $c^3$, around it sufficient to permit the lid to be moved into position as shown in Fig. 2.

The several parts of the casing and lid may be made of tin, sheet-iron, or other suitable material.

$d$ is the heater, made of same shape in cross-section as the interior of the casing, and provided with the lugs or projections $d'$, which keep the body of the heater from contact with the inner casing, $a$. It is provided with an eye or opening, $d^2$, adapted to receive a hook or other suitable implement employed to handle it when hot.

The casing and lid may be covered, when so desired, with thick felt or other suitable cloth.

In operation the heater is placed in the fire and brought to a proper degree of heat, and placed in the radiator in the position shown in Fig. 2, and the lid is applied and the device is placed in the sleigh, wagon, bed, or other place where it is desired to be used. The casing, being made approximately semi-cylindrical, whereby one side is flattened, as shown, will not roll with the motion of a vehicle, as is the case where the casing is cylindrical, but will remain where placed.

By means of the plate $c'$ the heater is prevented from being jolted into portion $a^2$ of the casing, and there is a double thickness of metal over the hand portion, and the same may be grasped at any time by the hand, so the device may be removed from place to place, as desired.

Where so desired, the sides of the cap could be cut off at about the point indicated in dotted lines, Fig. 1, leaving only a small flange or lip to fit over the end of the projecting handle portion $a^2$, thus economizing material. I prefer, however, the construction shown and before described.

It will be understood that instead of making the casing as shown and before described it might be made square or in other suitable angular shape, though the construction before described is preferred on account of its furnishing a curved foot-rest, also having a flat side to prevent its rolling, as before described.

It has heretofore been found inconvenient and difficult to handle foot-warmers of ordinary construction. Particularly is this true of those warmers which present a radiating surface entirely around them. In my device I have provided an end which will remain comparatively cool, and thus provide facilities for handling with ease. The chamber in which the heater $d$ is placed is separated from the chamber in the extension $a^2$ by the removable partition $c'$. This partition confines the heat to the main chamber, and provides an air-chamber between it and the outer end of the extension $a^2$. It will be seen that by this arrangement the chamber will be kept cool enough so that it may be taken hold of with the hand.

Having thus described my invention, what I claim, and desire to secure by Letters Patent, is—

In a foot-warmer, the combination, with the outer casing, $a'$, and the casing $a$, placed within the casing $a'$, and made fast thereto and having its end $a^2$ projected therefrom, of a lid or cap, $c$, provided with a depending rim which slips down on the outer side of the extension $a^2$, and a removable partition, $c'$, supported on the end of an arm, $c^2$, the opposite end of which is made fast to the inner face of the end plate of cap $c$, the said partition being arranged at a point opposite to or nearly opposite to the end of the outer casing, $a'$, as and for the purposes set forth.

In testimony whereof I affix my signature in presence of two witnesses.

JOHN T. SMITH.

Witnesses:
W. JOHNSON,
JOHN B. DAWSON.